United States Patent
Sun et al.

(10) Patent No.: US 11,512,711 B2
(45) Date of Patent: Nov. 29, 2022

(54) CENTRIFUGAL FAN FRAME BODY STRUCTURE

(71) Applicant: ASIA VITAL COMPONENTS CO., LTD., New Taipei (TW)

(72) Inventors: Sung-Wei Sun, New Taipei (TW); Ming-Che Lee, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 0 days.

(21) Appl. No.: 17/024,734

(22) Filed: Sep. 18, 2020

(65) Prior Publication Data

US 2022/0090607 A1 Mar. 24, 2022

(51) Int. Cl.
*F04D 29/42* (2006.01)
*F04D 17/16* (2006.01)
(Continued)

(52) U.S. Cl.
CPC ......... *F04D 29/4226* (2013.01); *F04D 17/16* (2013.01); *F04D 29/056* (2013.01);
(Continued)

(58) Field of Classification Search
CPC ...... F04D 17/16; F04D 25/0606; F04D 25/08; F04D 29/056; F04D 29/281;
(Continued)

(56) References Cited

U.S. PATENT DOCUMENTS 7,907,407 B2 * 3/2011 Ho ................... G06F 1/203
  361/720
8,585,362 B2 * 11/2013 Horng ................. F04D 25/0613
  415/215.1
(Continued)

FOREIGN PATENT DOCUMENTS

CN 2592923 Y 12/2003
CN 201176966 Y 1/2009
(Continued)

OTHER PUBLICATIONS

Search Report dated Jan. 21, 2021 issued by Taiwan Intellectual Property Office for counterpart application No. 109129907.
(Continued)

*Primary Examiner* — Woody A Lee, Jr.
*Assistant Examiner* — Joshua R Beebe
(74) *Attorney, Agent, or Firm* — Bradley J. Thorson; DeWitt LLP (57) ABSTRACT

A centrifugal fan frame body structure includes a lower case body and a cover body. The lower case body has a bottom section and an outer wall section. The outer wall section is formed with a wind outlet. The cover body and the lower case body are correspondingly mated with each other to form a space. In the space, the lower case body and the cover body define therebetween a first height. The lower case body and the cover body define therebetween a second height at the wind outlet. The second height is larger than the first height. The height of the wind outlet is enlarged, whereby the wind outlet will not be blocked by the cooperative heat dissipation component (module) so that the flow field efficiency is enhanced and the noise is lowered.

7 Claims, 9 Drawing Sheets

(51) Int. Cl.
    *F04D 29/58*      (2006.01)
    *F04D 29/056*     (2006.01)
(52) U.S. Cl.
    CPC ........ *F04D 29/582* (2013.01); *F05D 2230/20*
            (2013.01); *F05D 2240/14* (2013.01); *F05D*
            *2260/208* (2013.01); *F05D 2260/96* (2013.01)
(58) Field of Classification Search
    CPC .............. F04D 29/4226; F04D 29/582; F05D
            2230/20; F05D 2240/14; F05D 2260/96;
            F05D 2260/208; G06F 1/203
    See application file for complete search history.

(56) References Cited

U.S. PATENT DOCUMENTS

| | | | |
|---|---|---|---|
| 9,322,413 B2* | 4/2016 | Lin | F04D 25/08 |
| 2010/0142146 A1* | 6/2010 | Hwang | F04D 29/4226 361/695 |
| 2015/0062805 A1 | 3/2015 | Katsumata et al. | |
| 2018/0238340 A1* | 8/2018 | Tamaoka | F04D 29/4226 |
| 2018/0348826 A1* | 12/2018 | Aguirre | F04D 29/5853 |

FOREIGN PATENT DOCUMENTS

| | | |
|---|---|---|
| CN | 101998812 A | 3/2011 |
| CN | 102279639 A | 12/2011 |
| CN | 103835965 A | 6/2014 |
| CN | 105722370 A | 6/2016 |
| CN | 212337717 U | 1/2021 |
| TW | M342538 | 10/2008 |
| TW | 201144990 A | 12/2011 |
| TW | 201244620 A | 11/2012 |
| TW | M461819 | 9/2013 |
| TW | 201410991 A | 3/2014 |
| TW | M536454 | 2/2017 |

OTHER PUBLICATIONS

Search Report dated Apr. 26, 2022 issued by China National Intellectual Property Administration for counterpart application No. 2020109054604.

Search Report dated May 23, 2022 issued by Taiwan Intellectual Property Office for counterpart application No. 109129907.

* cited by examiner

CENTRIFUGAL FAN FRAME BODY STRUCTURE

BACKGROUND OF THE INVENTION

1. Field of the Invention

The present invention relates generally to a centrifugal fan frame body structure, and more particularly to a centrifugal fan frame body structure, which can improve the noise problem of the fan and enhance the structural strength of the fan case body.

2. Description of the Related Art

The conventional notebook has a narrow internal space. Also, the heat source of the notebook is positioned at the center thereof so that the heat is apt to accumulate. Therefore, in general, the manufacturer arranges a heat pipe to conduct the heat to the wind outlet on one side, whereby the fan can carry the heat conducted by the heat pipe away from the internal space so as to lower the temperature.

In the application of the cooling fan module of the conventional notebook, the heat pipe is spaced from the notebook case C/D piece only by 0.8-0.9 mm. The heat is radiated to the case C/D piece so that the temperature of the surface of the notebook is too high. This causes uncomfortable feeling of a user. The original fan structure is such designed that the upper cover (or bottom board) of the fan case has a height nearly equal to the height of the heat pipe. This limits the help of the heat pipe in lowering the temperature of the surface of the notebook. Moreover, the height of the border of the airflow is totally equal to the height of the heat pipe so that there is a resistance against the wind outlet of the fan. This will make noise. (In general, the fan is positioned on the left and right sides near the operation area of both hands and both legs). Therefore, the user is easy to feel the high temperature of the surface of the notebook. The high heat generated at the wind outlet will also lead to the heat generated on the bottom section of the notebook. When the user touches these areas, the user will feel uncomfortable. In addition, the heat dissipation (heat conduction) components or modules such as the heat pipe and the radiating fins are directly mated with each other or arranged at the wind outlet of the fan. This will affect the wind outputting or flow field efficiency of the fan. Moreover, this is apt to make noise and lead to poor heat dissipation effect.

It is therefore tried by the applicant to provide a centrifugal fan frame body structure to improve the shortcomings of the conventional centrifugal fan.

SUMMARY OF THE INVENTION

It is therefore a primary object of the present invention to provide a centrifugal fan frame body structure in which the height of the wind outlet of the fan case is enlarged so as to enhance the smoothness of flow-guiding of the fan and prevent the airflow at the wind outlet from hitting the heat conduction components to make noise.

To achieve the above and other objects, the centrifugal fan frame body structure of the present invention includes a lower case body and a cover body.

The lower case body has a bottom section and an outer wall section. The outer wall section is vertically annularly disposed along a periphery of the bottom section. The outer wall section is formed with a wind outlet. The cover body has an upper side, a lower side and a wind inlet. The wind inlet passes through the cover body between the upper and lower sides. The cover body and the lower case body are correspondingly mated with each other to form a space. The wind outlet is in communication with the wind inlet via the space. In the space, the lower case body and the cover body define therebetween a first height. The lower case body and the cover body define therebetween a second height at the wind outlet. The second height is larger than the first height.

The height of the wind outlet is enlarged, whereby the wind outlet will not be blocked by the other components (heat dissipation component of heat conduction component). In this case, the heat dissipation performance of the wind outlet will not be deteriorated or disabled and the noise at the wind outlet can be lowered.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
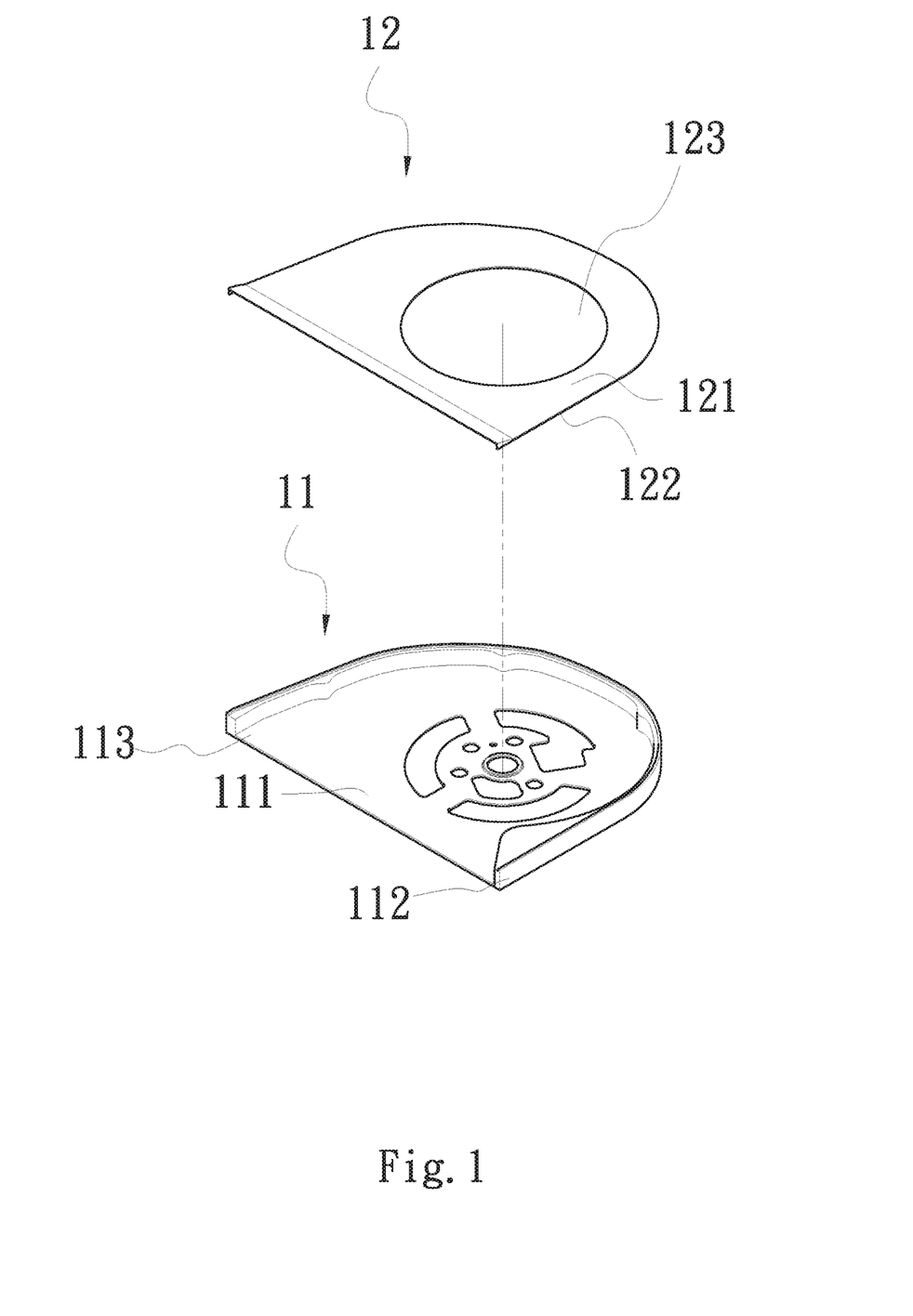
FIG. 1 is a perspective exploded view of a first embodiment of the centrifugal fan frame body structure of the present invention.
Figure 2:
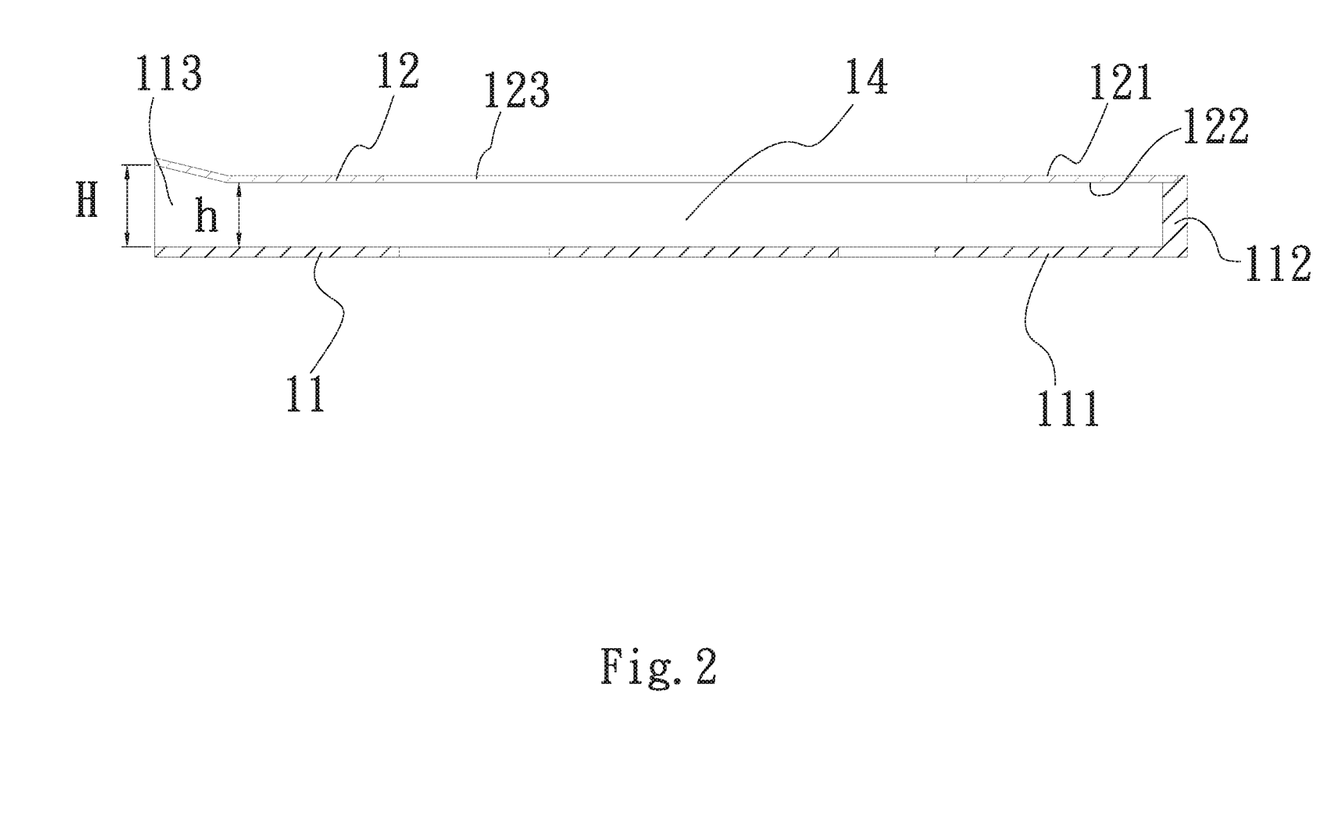
FIG. 2 is a sectional view of the first embodiment of the centrifugal fan frame body structure of the present invention.

Please refer to FIGS. 1 and 2. FIG. 1 is a perspective exploded view of a first embodiment of the centrifugal fan frame body structure of the present invention. FIG. 2 is a sectional view of the first embodiment of the centrifugal fan frame body structure of the present invention. The centrifugal fan frame body structure of the present invention includes a lower case body 11 and a cover body 12.

The lower case body 11 has a bottom section 111 and an outer wall section 112. The outer wall section 112 is vertically annularly disposed along a periphery of the bottom section 111. The outer wall section 112 is formed with a wind outlet 113.

The cover body 12 has an upper side 121 and a lower side 122 and a wind inlet 123. The wind inlet 123 passes through the cover body 12 between the upper and lower sides 121, 122. The cover body 12 and the lower case body 11 are correspondingly mated with each other to form a space 14. The wind outlet 113 is in communication with the wind inlet 123 via the space 14. In the space 14, the lower case body 11 and the cover body 12 define therebetween a first height h. In addition, the lower case body 11 and the cover body 12 define therebetween a second height H at the wind outlet 113. The second height H is larger than the first height h. The wind outlet 113 is formed in such a manner that the wind outlet 113 is abruptly expanded or linearly gradually expanded from the first height h to the second height H.

The present invention is mainly for improving the shortcoming of the conventional cooling fan that when the wind outlet of the centrifugal fan is assembled with the heat dissipation component (radiating fins) or the heat conduction component (heat pipe), the wind outlet of the conventional centrifugal fan is just blocked by the heat pipe and the radiating fins. This not only will affect the wind outputting efficiency of the centrifugal fan, but also will make noise at the wind outlet. In the present invention, the second height H at the wind outlet 113 is increased so that the second height H is slightly higher than the height of the heat dissipation component (radiating fins) or the heat conduction component (heat pipe) or the total height of the stacked heat dissipation component (radiating fins) and the heat conduction component (heat pipe). In this case, the wind outlet of the centrifugal fan is not blocked by the heat dissipation component (radiating fins) or the heat conduction component (heat pipe) so that the wind outputting efficiency of the wind outlet 113 of the centrifugal fan is forcedly enhanced. Also, the wind outlet 113 of the centrifugal fan is not blocked by the heat dissipation component (radiating fins) or the heat conduction component (heat pipe) so that no noise is made.

Figure 3A:
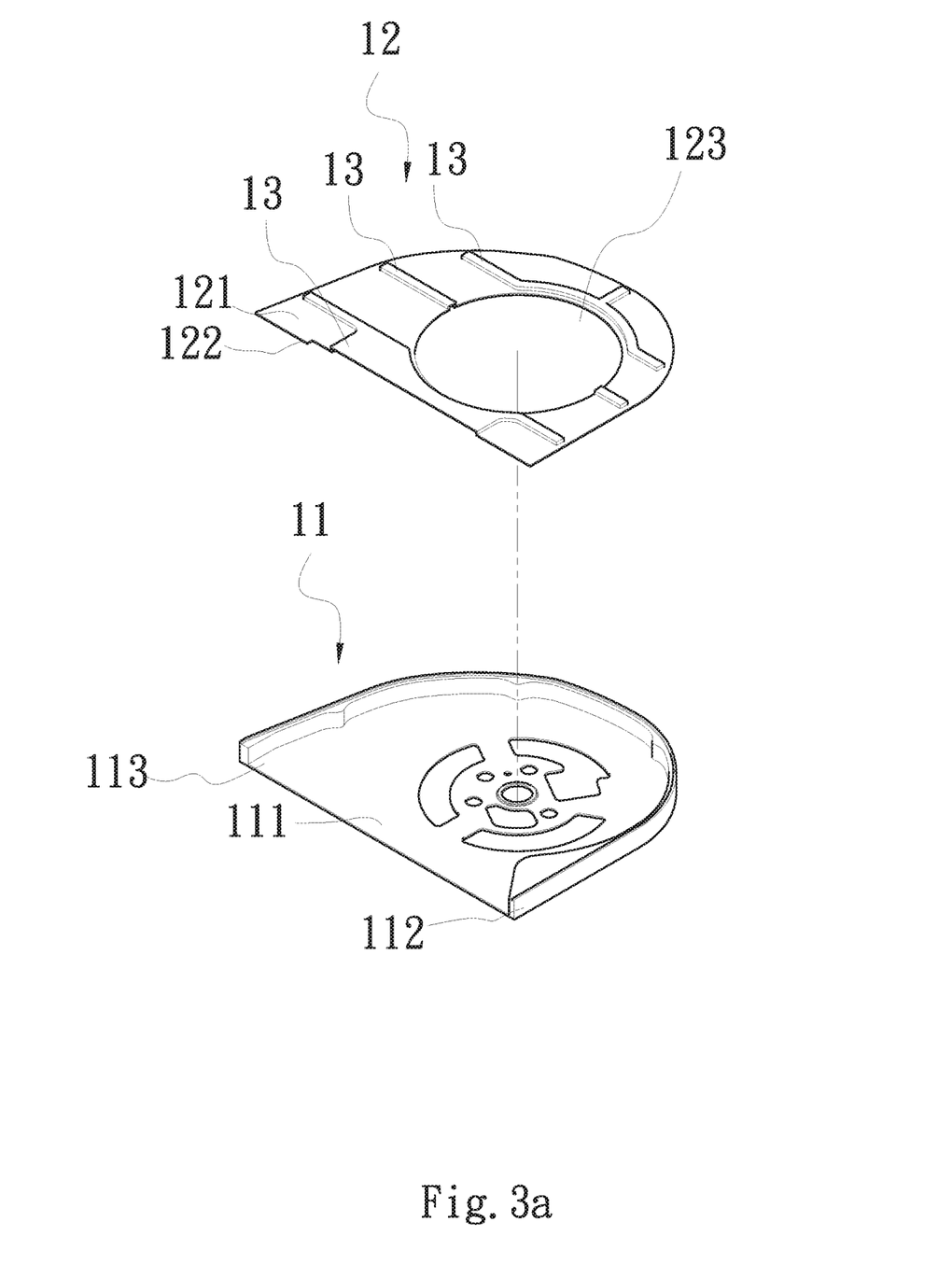
FIG. 3a is a perspective exploded view of a second embodiment of the centrifugal fan frame body structure of the present invention.
Figure 3B:
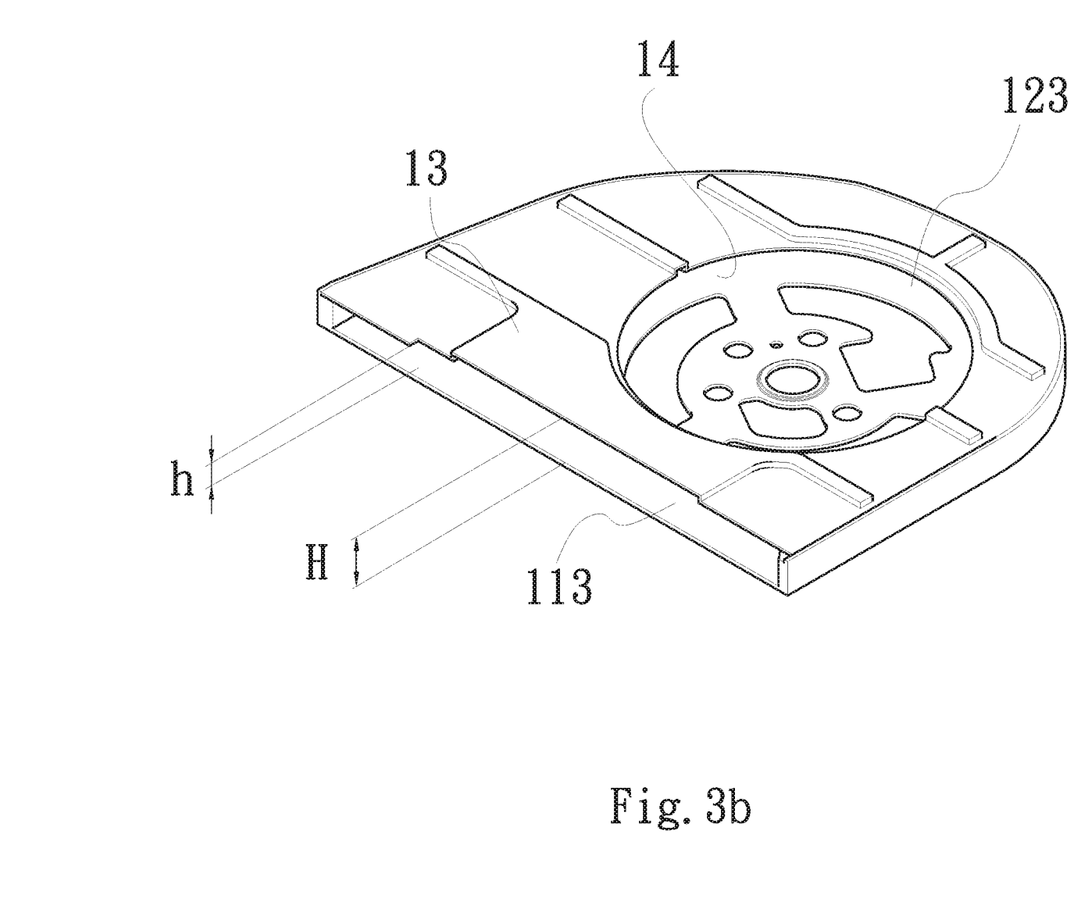
FIG. 3b is a perspective assembled view of the second embodiment of the centrifugal fan frame body structure of the present invention.
Figure 4A:
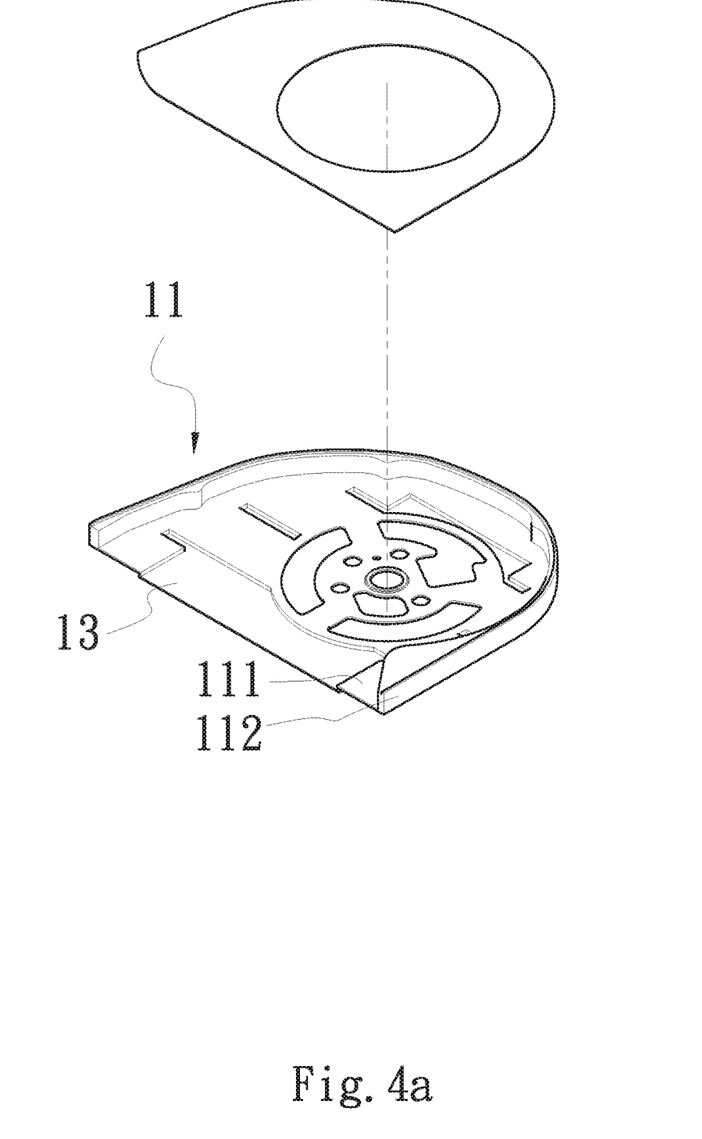
FIG. 4a is a perspective exploded view of the second embodiment of the centrifugal fan frame body structure of the present invention.
Figure 4B:
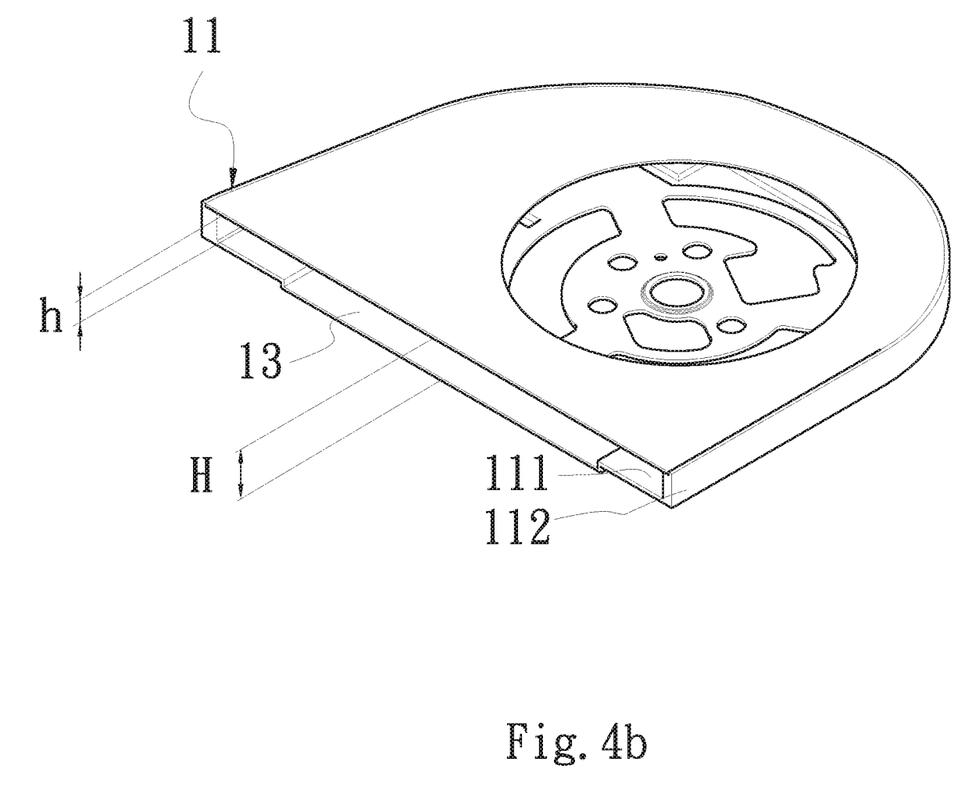
FIG. 4b is a perspective assembled view of the second embodiment of the centrifugal fan frame body structure of the present invention.

Please now refer to FIGS. 3*a*, 3*b*, 4*a* and 4*b*. FIG. 3*a* is a perspective exploded view of a second embodiment of the centrifugal fan frame body structure of the present invention. FIG. 3*b* is a perspective assembled view of the second embodiment of the centrifugal fan frame body structure of the present invention. FIG. 4*a* is a perspective exploded view of the second embodiment of the centrifugal fan frame body structure of the present invention. FIG. 4*b* is a perspective assembled view of the second embodiment of the centrifugal fan frame body structure of the present invention. The second embodiment is partially identical to the first embodiment in structure and thus will not be redundantly described hereinafter. The second embodiment is different from the first embodiment in that the centrifugal fan frame body structure of the present invention further has at least one reinforcing rib section 13. The reinforcing rib section 13 is selectively disposed on the lower case body 11 or the cover body 12 or both the lower case body 11 and the cover body 12. The reinforcing rib section 13 is formed as rib structure on the bottom section 111 of the lower case body 11 (as shown in FIG. 4) or the lower side 122 of the cover body 12 (as shown in FIG. 3) by means of extrusion or embossing. The reinforcing rib section 13 is a structure formed by means of punching. The reinforcing rib section 13 is formed on the cover body 12 and protrudes from the lower side 122 to the upper side 121. Alternatively, the lower case body 11 can be formed with the reinforcing rib section 13 by means of punching. The reinforcing rib section 13 protrudes from the bottom section 111 of the lower case body 11 to the other side. The reinforcing rib section 13 serves to enhance the structural strength of the lower case body 11 and the cover body 12.

In this embodiment, the reinforcing rib section 13 disposed in adjacency to the wind outlet 113 is further extended to the wind outlet 113. Accordingly, the height of the wind outlet 113 is enlarged to form the second height H, whereby the second height H is larger than the first height h.

Figure 5:
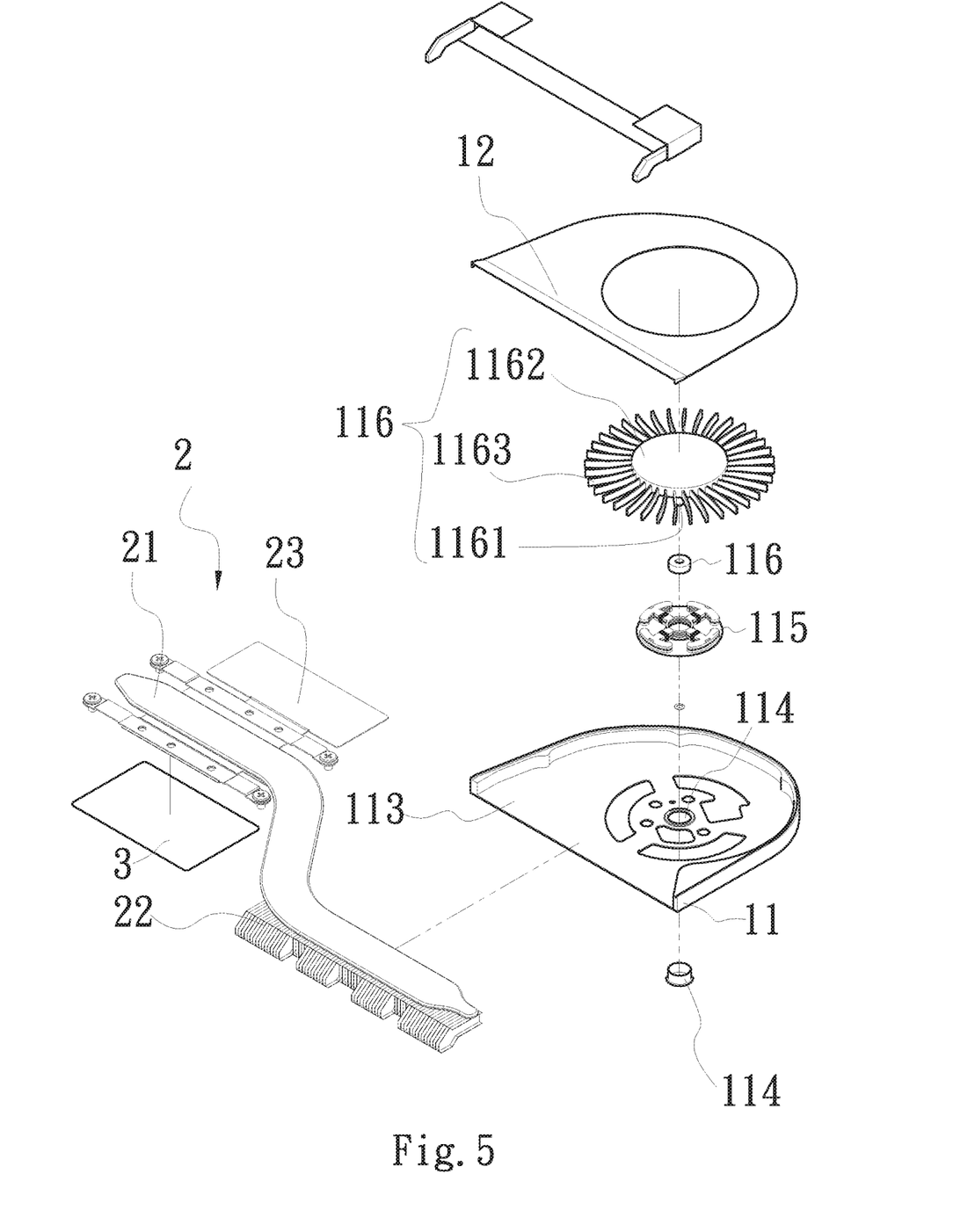
FIG. 5 is a view of a third embodiment of the centrifugal fan frame body structure of the present invention.
Figure 6:
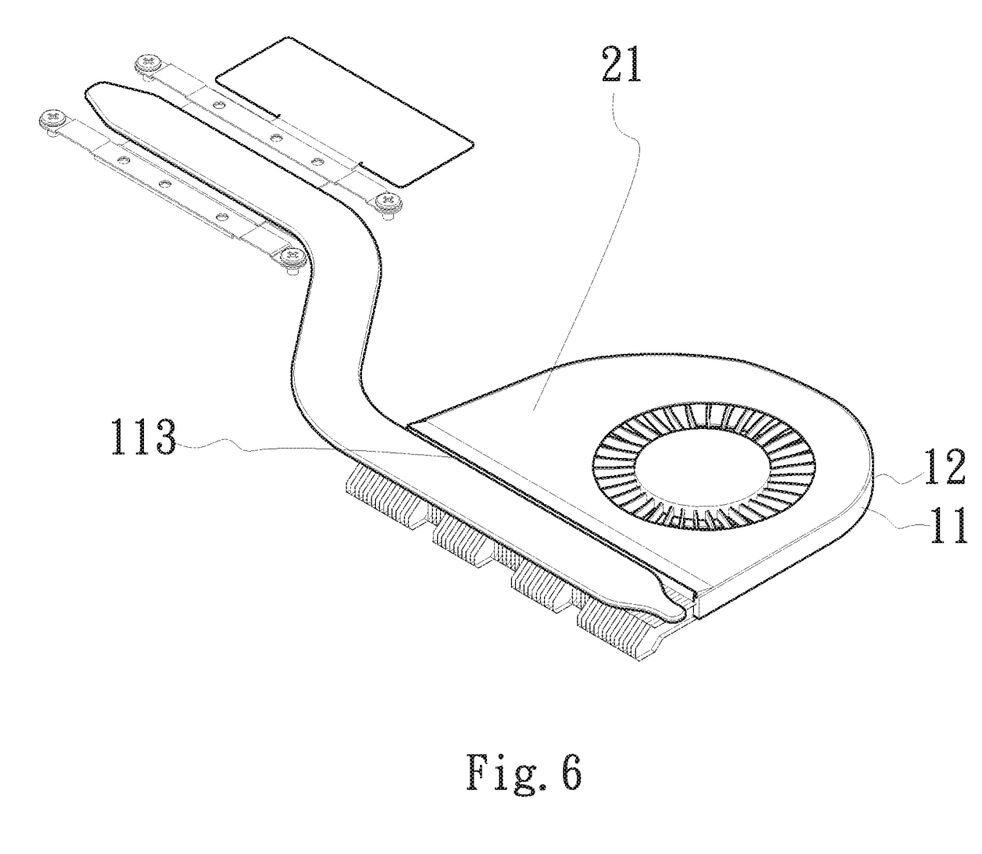
FIG. 6 is a view of the third embodiment of the centrifugal fan frame body structure of the present invention.
Figure 7:
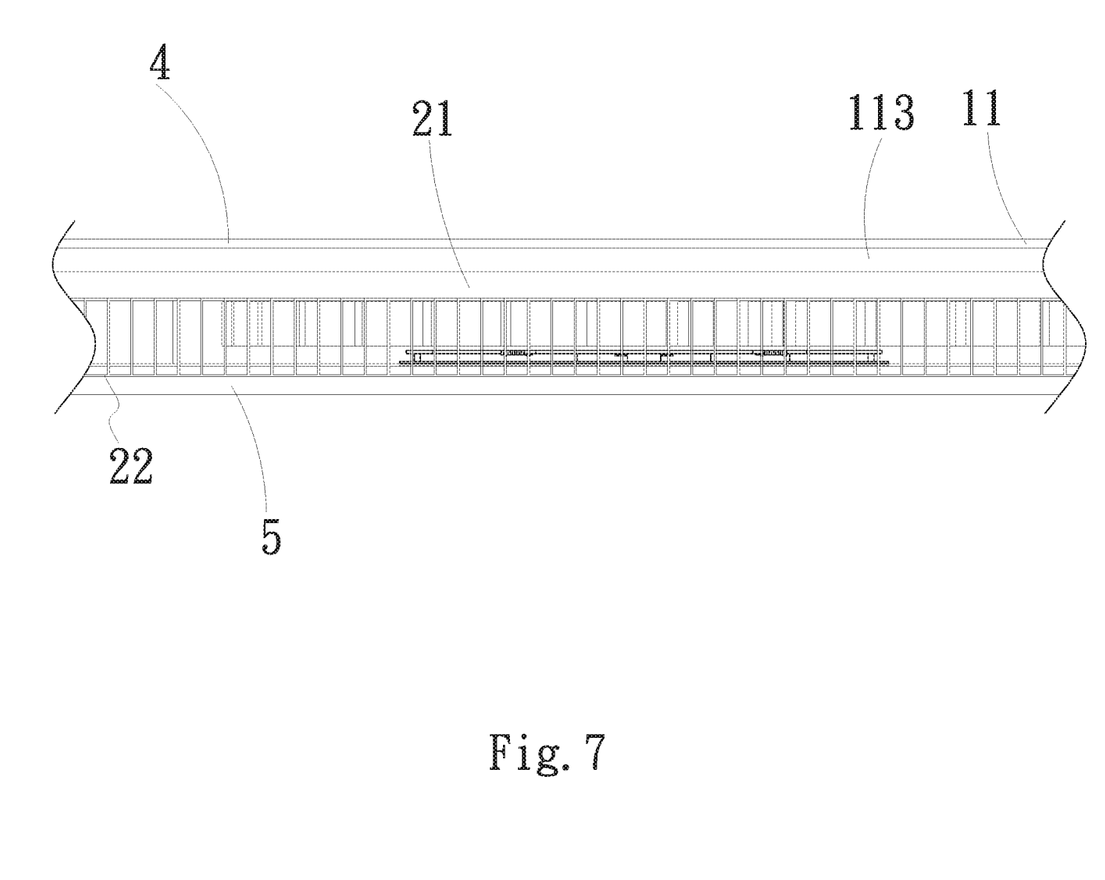
FIG. 7 is a view of the third embodiment of the centrifugal fan frame body structure of the present invention.

Please now refer to FIGS. 5, 6 and 7. FIG. 5 is a view of a third embodiment of the centrifugal fan frame body structure of the present invention. FIG. 6 is a view of the third embodiment of the centrifugal fan frame body structure of the present invention. FIG. 7 is a view of the third embodiment of the centrifugal fan frame body structure of the present invention. The third embodiment is partially identical to the first embodiment in structure and thus will not be redundantly described hereinafter. The third embodiment is different from the first embodiment in that the lower case body 11 further has a bearing cup 114 vertically extending from the lower case body 11. A stator 115 is fitter around the bearing cup 114. A bearing 116 is received in the bearing cup 114.

A rotor assembly 116 has a shaft 1161 and a fan impeller hub 1162. The shaft 1161 is perpendicularly connected with the fan impeller hub 1162. The shaft 1161 of the rotor assembly is rotatably disposed in the bearing 116. Multiple blades 1163 extend from outer side of the fan impeller hub 1162.

This embodiment further has a thermal module 2. The thermal module 2 has at least one heat pipe 21, a radiating fin assembly 22 and a base seat 23. The base seat 23 correspondingly contacts a heat source 3 to conduct the heat thereof. One end of the heat pipe 21 is connected with the base seat 23. The other end of the heat pipe 21 is connected with the radiating fin assembly 22. The heat pipe 21 and the radiating fin assembly 22 are correspondingly disposed at the wind outlet 113. The heat pipe 21 is lower than the second height H of the wind outlet 113.

As referring to FIGS. 3*a*, 3, 4*a* and 4*b*, the reinforcing rib section 13 mainly serves to enhance the structural strength of the lower case body 11 or the cover body 12. In addition, the reinforcing rib section 13 abuts against the case C piece 4 and the case D piece 5 of the notebook. In this embodiment, the original reinforcing rib section 13 of the lower case body 11 or the cover body 12 of the fan for enhancing the structural strength of the fan is combined with the wind outlet 113, whereby by means of the reinforcing rib section 13, the height of the wind outlet 113 is increased. Therefore, the shortcoming that the wind outlet 113 is blocked by the heat dissipation component or the heat conduction component is improved. In this case, the heat conduction efficiency will not be lowered and no noise is made at the wind outlet.

Moreover, the reinforcing rib section 13 of the present invention further increase the space between the case C piece 4 and the case D piece 5 of the notebook, whereby the airflow guided by the wind outlet 113 of the fan can flow between the case C piece 4 and the case D piece 5 of the notebook and the heat dissipation component (radiating fins) or the heat conduction component (heat pipe). Therefore, the cooling airflow in the case of the notebook is enhanced to avoid heat accumulation in a specific area.

The present invention has been described with the above embodiments thereof and it is understood that many changes and modifications in such as the form or layout pattern or practicing step of the above embodiments can be carried out without departing from the scope and the spirit of the invention that is intended to be limited only by the appended claims.

What is claimed is:

1. A centrifugal fan frame body structure comprising:
   a lower case body having a bottom section and an outer wall section, the outer wall section being vertically annularly disposed along a periphery of the bottom section, the outer wall section being formed with a wind outlet; and a cover body having an upper side, a lower side and a wind inlet, the wind inlet passing through the cover body between the upper and lower sides, the cover body and the lower case body being correspondingly mated with each other to form a space, the wind outlet being in communication with the wind inlet via the space, in the space, the lower case body and the cover body defining therebetween a first height proximate the wind inlet, the lower case body and the cover body defining therebetween a second height at an outer edge of the wind outlet, the second height being larger than the first height; and a thermal module having at least one heat pipe and a radiating fin assembly stacked together, one end of the heat pipe being connected with the radiating fin assembly, the heat pipe and the radiating fin assembly being disposed adjacent the wind outlet, a total height of the stacked heat pipe and radiating fin assembly being lower than the second height at the wind outlet.

2. The centrifugal fan frame body structure as claimed in claim 1, wherein the lower case body further has a bearing cup vertically extending from the lower case body, a stator being fitter around the bearing cup, a bearing being received in the bearing cup, a rotor assembly having a shaft and a fan impeller hub, the shaft being perpendicularly connected with the fan impeller hub, the shaft of the rotor assembly being rotatably disposed in the bearing, multiple blades extending from outer side of the fan impeller hub.

3. The centrifugal fan frame body structure as claimed in claim 1, wherein a reinforcing rib section formed on the cover body is a structure formed by means of punching, the reinforcing rib section being formed on the cover body and protruding from the lower side to the upper side, whereby the height of the wind outlet is enlarged to form the second height.

4. The centrifugal fan frame body structure as claimed in claim 1, wherein a reinforcing rib section formed on the lower case body is a structure formed by means of punching, the reinforcing rib section being formed on the lower case body and protruding from the bottom section of the lower case body to the other side, whereby the height of the wind outlet is enlarged to form the second height.

5. The centrifugal fan frame body structure as claimed in claim 1, further comprising at least one reinforcing rib section, the reinforcing rib section being selectively disposed on the lower case body or the cover body or both the lower case body and the cover body, the reinforcing rib section horizontally extending to the wind outlet.

6. The centrifugal fan frame body structure as claimed in claim 1, wherein the thermal module has a base seat, the base seat correspondingly contacting a heat source to conduct the heat thereof, the other end of the heat pipe being connected with the base seat.

7. The centrifugal fan frame body structure as claimed in claim 1, wherein the wind outlet is formed in such a manner that the wind outlet is abruptly expanded or linearly gradually expanded from the first height to the second height.

* * * * *